United States Patent
Douxchamps et al.

(10) Patent No.: US 10,431,007 B2
(45) Date of Patent: Oct. 1, 2019

(54) METHOD AND SYSTEM FOR USER INTERACTION

(71) Applicant: Augumenta Ltd., Oulu (FI)

(72) Inventors: Damien Douxchamps, Kyoto (JP); Tero Aaltonen, Taipei (TW); Peter Antoniac, Oulu (FI); Harri Kovalainen, Oulu (FI)

(73) Assignee: AUGUMENTA LTD., Oulu (FI)

( * ) Notice: Subject to any disclaimer, the term of this patent is extended or adjusted under 35 U.S.C. 154(b) by 100 days.

(21) Appl. No.: 15/609,113

(22) Filed: May 31, 2017

(65) Prior Publication Data

US 2017/0344124 A1 Nov. 30, 2017

Related U.S. Application Data

(60) Provisional application No. 62/343,228, filed on May 31, 2016.

(51) Int. Cl.
| | |
|---|---|
| *G06F 3/01* | (2006.01) |
| *G06F 3/0481* | (2013.01) |
| *G06T 19/00* | (2011.01) |
| *G06F 1/16* | (2006.01) |
| *G06F 3/00* | (2006.01) |
| *G06F 3/03* | (2006.01) |
| *G06F 3/042* | (2006.01) |
| *G06F 3/0488* | (2013.01) |
| *G06F 3/0484* | (2013.01) |

(52) U.S. Cl.
CPC .......... *G06T 19/006* (2013.01); *G06F 1/163* (2013.01); *G06F 1/1686* (2013.01); *G06F 3/002* (2013.01); *G06F 3/011* (2013.01); *G06F 3/0304* (2013.01); *G06F 3/0425* (2013.01); *G06F 3/0426* (2013.01); *G06F 3/04847* (2013.01); *G06F 3/04886* (2013.01)

(58) Field of Classification Search
CPC ....... G06T 19/006; G06T 11/60; G06F 1/163; G06F 1/1686; G06F 3/002; G06F 3/011; G06F 3/0304; G06F 3/0425; G06F 3/0426; G06F 3/04847; G06F 3/04886
See application file for complete search history.

(56) References Cited

U.S. PATENT DOCUMENTS

| | | | |
|---|---|---|---|
| 2008/0174570 A1* | 7/2008 | Jobs ...................... | G06F 3/0488 345/173 |
| 2017/0293351 A1* | 10/2017 | Li ......................... | G02B 27/017 |
| 2017/0322622 A1* | 11/2017 | Hong ...................... | G06F 3/012 |

* cited by examiner

*Primary Examiner* — Wing H Chow
(74) *Attorney, Agent, or Firm* — Ziegler IP Law Group, LLC

(57) ABSTRACT

The present disclosure provides a method for user interaction. The method includes pointing a first device having a sensor, towards a panel defining a physical area having a plurality of markers rendered thereon, recognizing an interaction area defined by the plurality of markers on the panel, and rendering a plurality of graphical user interface elements on the panel in an Input/Output viewport. The plurality of markers includes at least one of an object and a shape recognizable by suitable computer vision means. Further, the Input/Output viewport includes a spatial volume between the first device and the panel.

14 Claims, 9 Drawing Sheets

METHOD AND SYSTEM FOR USER INTERACTION

TECHNICAL FIELD

The aspects of the disclosed embodiments relate to the field of augmented reality and, in particular, to a method and a system for user interaction by rendering a plurality of graphical user interface elements on a panel by in an augmented reality environment.

BACKGROUND

Recently, the field of communications has witnessed significant improvements in existing communication technologies and an increase in development of new technologies. Nowadays, an increasing number of users are making use of communication devices which provide high computing power, portability, data storage, and so forth. To enhance communication of users with their environment, new techniques and devices are being developed.

An emerging technology, namely augmented reality, may be used to enhance the user's perception of reality by providing the user with a feeling of presence and involvement in an augmented reality environment. The augmented reality can be rendered by use of devices like head-up displays, head mounted devices, smart glasses, contact lenses and so forth. The devices used to render the augmented reality may be worn by the user and may include computing units, cameras, sensors, and so forth to create virtual interfaces around the users. Additionally, the augmented reality may allow users to utilize gesture recognition technology to communicate with other devices or virtual objects in the augmented reality environment.

Present techniques to render the augmented reality involve overlaying virtual objects in the user's environment. However, the overlaying of objects may be anywhere in the user's environment and accordingly may obstruct the user's field of view. Additionally, present day techniques make use of physical control panels with buttons, sliders, and so forth, to allow user interaction with the virtual objects. In some situations, the use of physical control panels may compromise on the privacy of the user.

Therefore, in light of the foregoing discussion, there exists a need to overcome the aforementioned drawbacks associated with conventional techniques of user interaction in an augmented reality environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are various embodiments of the present disclosure providing a method and a system for user interaction.

In an aspect of the present disclosure, a method for user interaction is disclosed. The method includes pointing a first device having a sensor towards a panel defining a physical area having a plurality of markers rendered thereon. The plurality of markers comprises at least one of an object and a shape recognizable by suitable computer vision means. The method further includes recognizing an interaction area defined by the plurality of markers on the panel. Furthermore, the method includes rendering a plurality of graphical user interface elements on the panel in an Input/Output viewport. The Input/Output viewport comprises a spatial volume between the first device and the panel.

In an embodiment, the method further includes recognizing at least one of a hand, a finger and a predefined detectable object in the Input/Output viewport. The at least one of the hand, the finger and the predefined detectable object is directed towards at least one of the plurality of graphical user interface elements.

In another embodiment, the at least one of the hand, the finger and the predefined detectable object is directed for performing at least one control operation of at least one of the first device and a second device.

In an embodiment, the method further includes rendering a new state of the plurality of graphical user interface elements in the Input/Output viewport.

In some embodiment, rendering the new state further comprises performing a perspective correction with one or more parameters defined by recognizing the plurality of markers and their geometrical relationship with each other when rendering the plurality of graphical user interface elements.

In another embodiment, rendering the plurality of graphical user interface elements in the Input/Output viewport comprises rendering the graphical user interface elements such that the graphical user interface elements visually align with the panel.

In one embodiment, at least one of the plurality of markers comprises at least one of information and a hyperlink to the information. The information comprises at least one of a location, product information, and user information.

In further embodiment, at least two of the plurality of markers are configured to be used as geometrical markers for defining a geometrical position and an orientation of the panel with respect to the first device.

In another embodiment, the method further includes combining a device identifier with a panel identifier for rendering a personalized content on the first device.

In yet another embodiment, the method further comprises detecting movement of the first device, and employing the detected movement to adjust a location of the interaction area.

In another aspect of the present disclosure, a system for user interaction is disclosed. The system includes a server comprising a database configured to store a plurality of device identifiers, a plurality of panel identifiers, and rendering information. The system further includes a first device having a sensor configured to be used for pointing towards a panel defining a physical area having a plurality of markers rendered thereon. The first device includes a recognizing module and a rendering module. The recognizing module is configured to recognize an interaction area defined by the plurality of markers on the panel. The plurality of markers comprises at least one of an object and a shape recognizable by suitable computer vision means. The rendering module is configured to render a plurality of graphical user interface elements on the panel in an Input/Output viewport comprising a spatial volume between the first device and the panel.

In one embodiment, the recognizing module is further configured to recognize at least one of a hand, a finger and a predefined detectable object in the Input/Output viewport. The at least one of the hand, the finger and the predefined detectable object is directed towards at least one of the plurality of graphical user interface elements.

In an embodiment, the rendering module is further configured to render a new state of the plurality of graphical user interface elements in the Input/Output viewport.

In one embodiment, the rendering module is further configured to perform a perspective correction with one or more parameters defined by recognizing the plurality of markers and their geometrical relationship with each other when rendering the plurality of graphical user interface elements.

In another embodiment, the rendering module is further configured to combine a device identifier with a panel identifier for rendering a personalized content on the first device.

In further embodiment, at least one of the plurality of markers comprises at least one of information and a hyperlink to the information. The information comprises at least one of a location, product information, and user information.

In some embodiment, at least two of the plurality of markers are configured to be used as geometrical markers for defining a geometrical position and orientation of the panel with respect to the first device.

In another embodiment, the first device further comprises at least one motion sensor configured to detect movement of the first device, and wherein the first device employs the detected movement to adjust a location of the interaction area.

BRIEF DESCRIPTION OF THE FIGURES

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
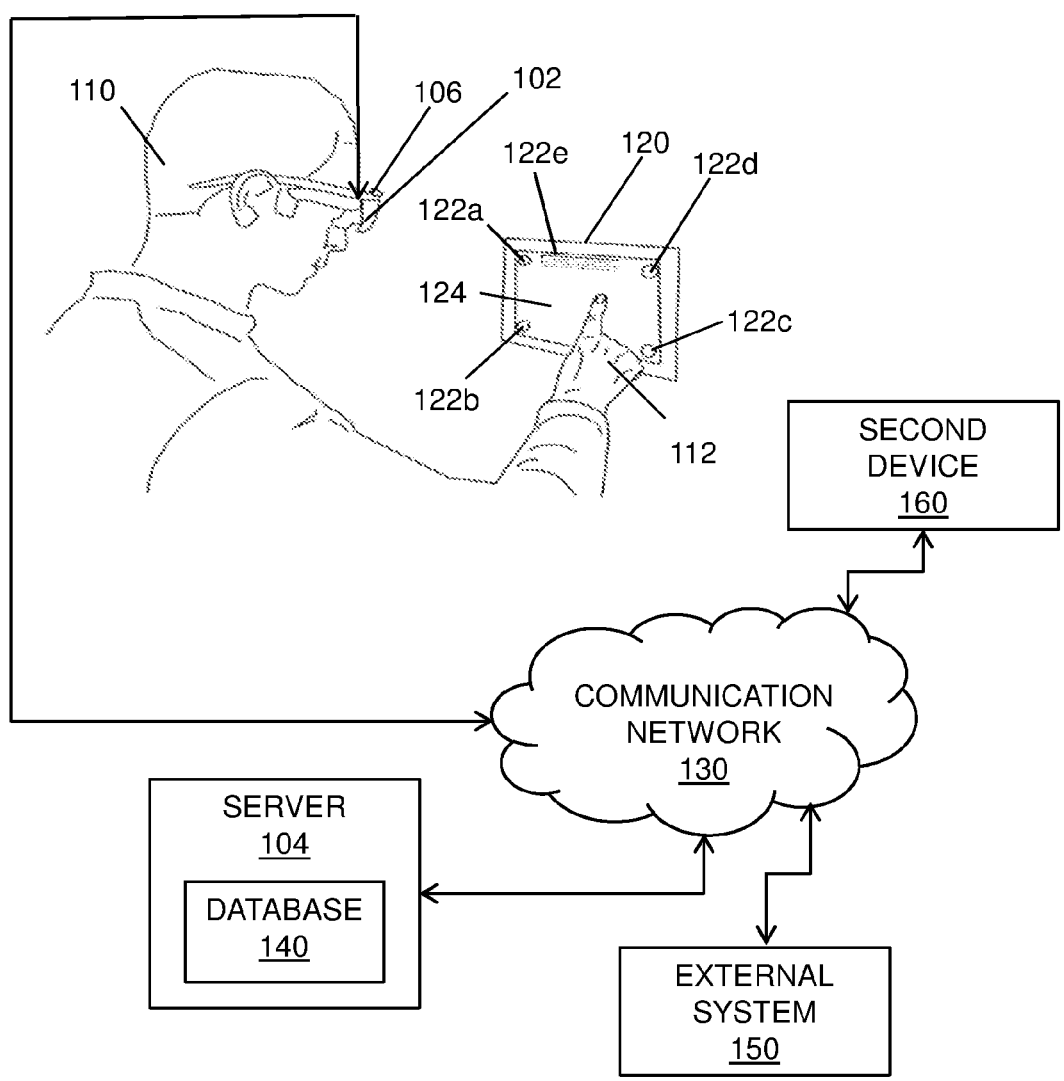
FIG. 1 is a schematic illustration of a system for user interaction, in accordance with an embodiment of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The functional units described in this specification have been labeled as systems or devices. A module, device, or a system may be implemented in programmable hardware devices such as, processors, digital signal processors, central processing units, field programmable gate arrays, programmable array logic, programmable logic devices, cloud processing systems, or the like. The devices/modules may also be implemented in software for execution by various types of processors. An identified device/module may include executable code and may, for instance, comprise one or more physical or logical blocks of computer instructions, which may, for instance, be organized as an object, procedure, function, or other construct. Nevertheless, the executable of an identified device/module need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

FIG. 1 is a schematic illustration of a system 100 for user interaction, in accordance with an embodiment of the present disclosure. As shown, the system 100 includes a first device 102 and a server 104. The first device 102 includes a sensor, such as a camera 106. Further, the first device 102 is associated with a user 110 shown with a hand 112. The first device 102 can be an interactive computing device associated with the user 110. The first device 102 may include an integrated processing device (not shown). Further, the first device 102 may be a wearable computing device. In an embodiment, as shown, the first device 102 is a device worn on a head of the user 110 with a screen/display in front of eyes. The screen/display may display information such as information associated with a smart-phones.

Examples of the first device 102 may include, but are not limited to, digital eyeglasses, a wearable necklace, a Google Glass, a stereoscopic smart glass, a monocular glass, a head-mounted optical device, a smart phone, a tablet, a virtual reality based glass (such as, Oculus Rift, Microsoft Hololens). In a preferred embodiment, the first device 102 is an augmented reality based device, such as the Google Glass™. The Google Glass™ is associated with a wearable technology having an optical head-mounted display (OHMD). The first device 102 can be any other wearable device configured to integrate an image capturing device, such as the camera 106, LiDARs and one or more sensors. In a preferred embodiment, the first device 102 is a combination of a camera, a display, a microphone, a speaker and a computing/communication means. In some embodiments, the first device 102 may have networking capabilities to transmit/receive data.

As shown, the first device 102 having the camera 106 is configured to be used for pointing towards a panel 120 defining a physical area having a plurality of markers, such as markers 122a-e rendered thereon. As shown, the markers 122a-d define an interaction area 124 on the panel 120. The user 110 interacts with the panel 120 using the first device 102 via at least of the hand 112, a finger and a predefined detectable object. For example, the predefined detectable object includes a pen.

Examples of the panel 120 include, but are not limited to, a sheet of material with printed markers, a television/computer/digital display with electronically (dynamically) rendered markers. Further, the panel 120 can be a printed canvas, a picture projected on a surface. In some embodiments, the panel 120 can be painted with special colors that only special cameras having infrared/ultraviolet capabilities can see. Further, the panel 120 may not be flat. Moreover, the panel 120 can be of any shape that is recognizable by the camera 106. For example, the panel 120 can be curved, squared or rounded. In an embodiment, the panel 120 should be easy to clean and/or replace.

In another embodiment, the panel 120 may comprise a location of the panel 120. For example, in such embodiment, the location of the panel 120 may be printed thereon or embedded therein. For example, a panel on a front side of a building may comprise the address and/or geographical coordinates of the building printed thereon. In yet another embodiment, the panel 120 may further comprise a location sensing unit (such as a global positioning system receiver) coupled thereto. Optionally, the location sensing unit may be coupled to the sensor without obstructing the user 110's view of the panel 120. For example, a global positioning system receiver may be coupled to the rear side of the panel 120.

In a preferred embodiment, the interaction area 124 is black or dark in color so that overlaying (or rendering) of a plurality of graphical user interface elements (described herein later) can work better. The color of the interaction area 124 affects user 110 perception in augmented reality, when the plurality of graphical user interface elements is rendered semi-transparently. For example, a dark colored interaction area may improve visibility from the user 110's perspective. The first device 102 may measure the color of the interaction area 124 and the measurement result may affect the rendering of the graphical user interface elements with the first device 102 in terms of contrast, choosing the color scheme and so forth. The interaction area 124 is further recommended to be within the marker pattern (i.e. lie within the markers 122a-d). However, in one embodiment, the interaction area 124 can extend outside an area defined by the markers 122a-d. In some embodiments, the interaction area 124 can also be created with dyes that are only seen within a specific wavelength, i.e. such dyes may not be visible to human eyes. In an exemplary embodiment, the interaction area 124 can be created using the infrared/ultraviolet paints that are not visible to humans but can be detected with the special cameras having the infrared/ultraviolet capabilities. This helps the first device 102 to extract the plurality of markers 122a-e and report information associated with the plurality of markers 122a-e to the server 104. The information associated with the plurality markers 122a-e at least partially defines the user interface to be rendered. Further, the interaction area 124 can be of any size, for example, from a small size (as small as camera optics allow) and up to building size (like a billboard).

The server 104 is communicably connected to the first device 102 through a communication network 130. The server 104 comprises a database 140 configured to store a plurality of device identifiers, a plurality of panel identifiers, and rendering information. In an embodiment, the rendering information includes information associated with the plurality of graphical user interface elements rendered on the panel 120, for example, which graphical user interface element to be rendered and so forth, described in greater detail herein later. In an embodiment the server 104 and the database 140 are embedded in the first device 102 to allow operation without communication network 130.

The system may further be communicably connected to one or more external systems 150 to enable functionalities, such as sending control commands to the external system 150, or querying information from the external system 150.

According to an embodiment, the server 104 generally refers to an application, program, process or device that responds to requests for information or services by another application, program, process or device on the communication network 130. In the present embodiment, the first device 102 exchanges information with the server 104. According to another embodiment, the server 104 also encompasses software that makes an act of serving information or providing services possible.

The communication network 130 may include, for example, Wide Area Networks (WANs), Local Area Networks (LANs), analog or digital wired and wireless telephone networks (for example, a PSTN, Integrated Services Digital Network (ISDN), a cellular network, and Digital Subscriber Line (xDSL)), radio, television, cable, satellite, and/or any other delivery or tunneling mechanism for carrying data. The communication network 130 may include multiple networks or sub networks, each of which may include, for example, a wired or wireless data pathway. The communication network 130 may include a circuit-switched voice network, a packet-switched data network, or any other network able to carry electronic communications. For example, the communication network 130 may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the communication network 130 may also include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Figure 2A:
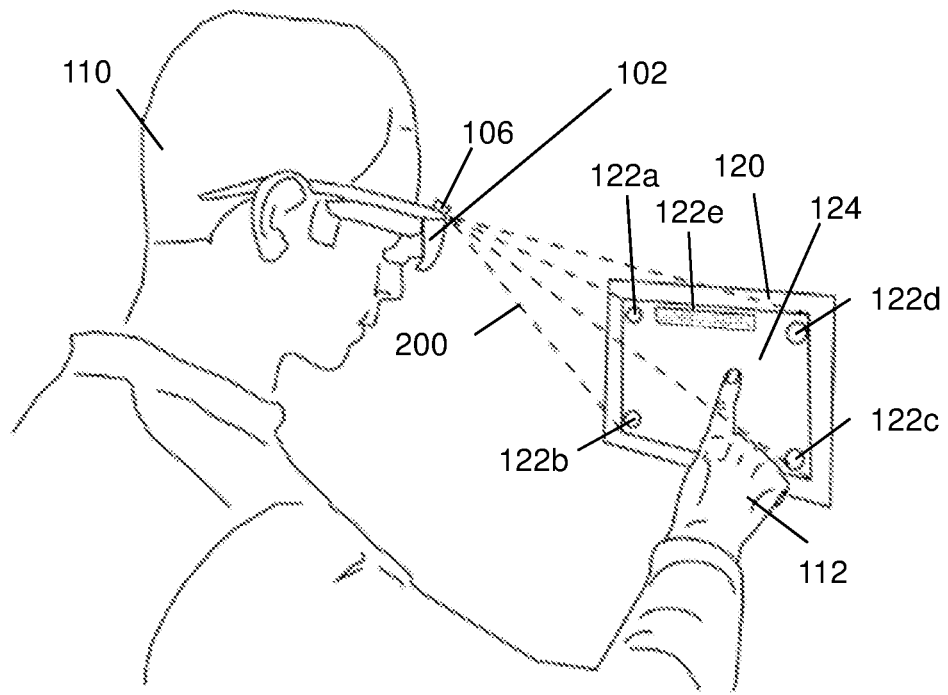
FIG. 2A-2C are schematic illustration of environments in which an embodiment of the present disclosure may be implemented.
Figure 2B:
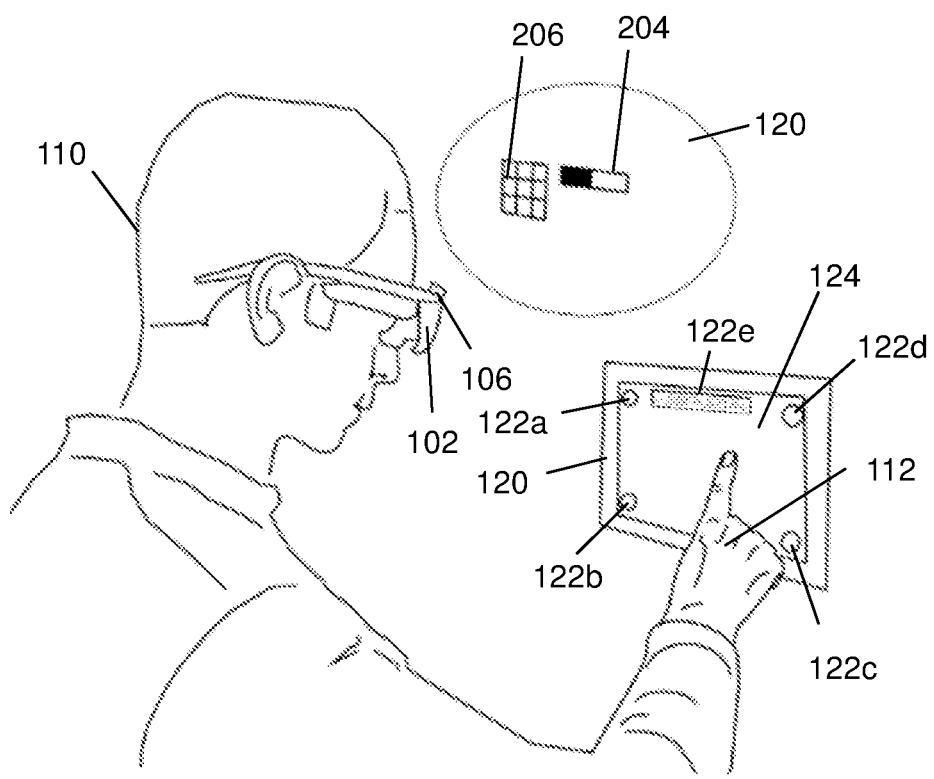
Figure 2C:
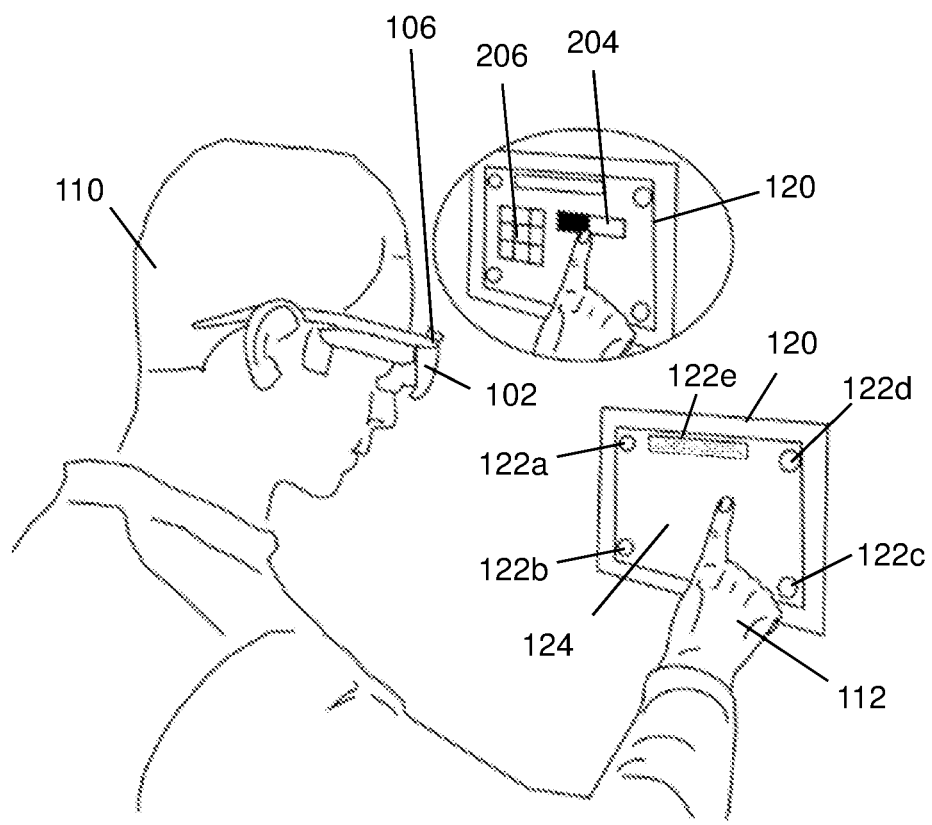

Referring now to FIGS. 2A-2C, illustrated is schematic illustration of environments in which an embodiment of the present disclosure may be implemented. More specifically, FIGS. 2A-2C illustrate schematic illustrations of environments associated with the system 100 shown in FIG. 1. For example, an environment 200A (of FIG. 2A) shows the user 110 wearing the first device 102, which includes a transparent or a see-through display. The user 110 interacts with the panel 120 using a finger of the hand 112. The interaction area 124 is viewed by the camera 106 of the first device 102. Further, the interaction area 124 is defined by the plurality of markers, such as the markers 122a-d on the panel 120. Further, shown is an Input/Output viewport 200, which is a spatial volume between the first device 102 and the panel 120. In one example, the Input/Output viewport 200 may be a conical spatial volume between the first device 102 and the panel 120. Further, the Input/Output viewport 200 is a space wherein the plurality of graphical user interface elements can be rendered. Further, in the Input/Output viewport 200, movement of the hand 112 can be also recognized. Specifically, from user's 110 perspective the Input/Output viewport 200 appears to contain the panel 120. In an embodiment, the Input/Output viewport 200 may cover a full field of vision of the camera 106.

Referring now to FIG. 2B, an environment 200B shows the user 110 wearing the first device 102. The user 110 interacts with the panel 120 using a finger of the hand 112. The interaction area 124 is viewed by the camera 106 of the first device 102, and the Input/Output viewport 200 (shown in FIG. 2A) for the system is defined (together with the camera 106). The Input/Output viewport 200 (shown in FIG. 2A) is used as a rendering area for the plurality of graphical user interface elements that can change states when the user 110 overlays the finger on top of them. The plurality of graphical user interface elements includes, but is not limited to, a virtual button, a virtual keypad and a virtual slider. In a preferred embodiment, the plurality of graphical user interface elements includes a virtual slider 204 and a virtual keypad 206. In an embodiment, in the virtual keypad 206, layout can be alphanumeric, numeric, uppercase, lowercase, and so on. In another embodiment, the graphical user interface comprises live elements, such as video received from the external system 150. It may be evident to those skilled in the art that any type of graphical user interface element can be rendered and can be seen by the user 110 on top/front of the panel 120. In an embodiment a preferred visual positioning of the graphical user interface elements is behind the panel 120.

Referring now to FIG. 2C, an environment 200C shows the user 110 wearing the first device 102. Further, the user 110 interacts with the panel 120 using the first device 102 via the hand 112. Furthermore, the user 110 views the plurality of graphical user interface elements and overlays the hand 112 on top of them. The user 110 operates the virtual slider 204 and the virtual keypad 206, which can only be seen by the user 110 (and not by another person).

In operation, the first device 102 having the camera 106 is configured to be used for pointing towards the panel 120 defining the physical area having the plurality of markers, such as the markers 122a-d rendered thereon. The database 140 of the server 104 is configured to store the plurality of device identifiers (such as an identifier corresponding to the first device 102), a plurality of panel identifiers (such as an identifier corresponding to the panel 120). The database 140 of the server 104 may be further configured to store a plurality of user identifiers to enable the system to provide a user specific user interface. The first device 102 is configured to recognize the panel 120 based on instructions from the server 104 or from its own central processing unit.

Further, the first device 102 is configured to detect the plurality of markers, such as the markers 122a-e rendered on the panel 120. In an embodiment, a shape of the markers 122a-d is known to (or predefined with) the server 104. Alternatively, the shape of the markers 122a-d is known to (or predefined with) the first device 102. In an example, the detected plurality of markers, such as the markers 122a-d, are fiducial markers. The fiducial markers 122a-d allow the first device 102 to know precisely where the panel 120 is located and how the panel 120 is oriented with respect to the first device 102. This allows the overlay of the plurality of graphical user interface elements to be perspective-correct for the user 110. In other words, the overlay of the plurality of graphical user interface elements appears to the user 110 in a visually consistent way with respect to the panel 120, for example by appearing on the panel 120, over the panel 120 or inside/behind the panel 120, and tilted accordingly with respect to orientation of the panel 120. The plurality of graphical user interface elements may be rendered visually in an arrangement so as to depict depth of the plurality of graphical user interface elements from a perspective of the user 110.

The plurality of markers, such as the markers 122a-e includes at least one of an object and a shape recognizable by suitable computer vision means. According to an embodiment, the object recognizable by suitable computer vision means includes at least one of the plurality of markers 122a-e, such as the marker 122e. In one example, the object comprises at least one of information and a hyperlink to the information, wherein the information comprises at least one of a location, product information, and user 110's information. In an example, the marker 122e may comprise information of a location of the user 110.

In an embodiment, the user 110's information may comprise at least one user defined identification code. Specifically, the user 110 may use the first device 102 to define at least one identification code, to be associated with the user 110. Furthermore, optionally, the at least one identification code defined by the user may be stored at the database 140 of the server 104. Therefore, in such instance, identification codes defined by a plurality of users may constitute the aforementioned plurality of user identifiers stored at the database 140 of the server 104. In one embodiment, the at least one user defined identification code may be in form at least one of: quick response code, one dimensional barcode, two dimensional barcode, alphanumeric code, radio frequency identification (RFID) code.

According to an embodiment, the user 110's information may further comprise at least one of: name of an owner of the panel 120, contact information of the owner of the panel, maintenance personnel of the panel 120, list of users authorized to access the panel 120.

According to an embodiment of the present disclosure, at least two of the markers 122a-d are configured to be used as geometrical markers for defining a geometrical position and an orientation of the panel 120 with respect to the first device 102. The preferred visual rendering position or format of the plurality of graphical user interface elements may be defined by some of the markers 122a-e.

In one embodiment, the object is included within the shape recognizable by suitable computer vision means. In such instance, the computer vision means may be operable to individually recognize the object and the shape. In an example, the object (such as the marker 122e) may be a quick response code that is included within a shape (such as one of the markers 122a-d) that is used to define an interaction area on the panel 120. In such instance, the first device 102 may be operable to recognize the shape to know the location and orientation of the panel 120 with respect to the first device 102. Subsequently, the first device 102 may recognize the quick response code of the object to retrieve an information associated with the panel 120.

In an embodiment, once the plurality of markers, such as the markers 122a-e is detected, the panel 120 is configured to provide some information. The information includes, but is not limited to, a plurality of panel identifiers or more complex information provided as one dimensional barcodes, two dimensional barcodes, quick response codes, alphanumeric codes, radio frequency identification (RFID) codes. Since the detection of the panel 120 is done in 3D, a precise location and an orientation of the panel 120 with respect to the user 110 can be known. This determines where the user 110 is, or where is he/she looking at.

According to an embodiment, the first device 102 may be operable to detect an identification code (shown in FIGS. 4A-4B) in the panel 120. Specifically, the identification code in the panel 120 relates to a panel identifier corresponding to the panel 120. More specifically, such identification code in the panel 120 may be a representation of the panel identifier in an encoded format. In one embodiment, the identification code in the panel 120 may be in form of at least one of: quick response code, one dimensional barcode, alphanumeric code, radio frequency identification (RFID) code.

According to another embodiment, upon detection of the identification code in the panel 120, the first device 102 may retrieve information contained in the identification code. Specifically, the information contained in identification code may include at least one of: panel identifier (in a decoded format), location of the panel 120, product identifier of the panel 120, hyperlink pertaining to the panel 120. In an embodiment, the information contained in the identification code (in the panel 120) may be stored at the database 140 of the server 104. In another embodiment, the information contained in the identification code (in the panel 120) may be stored at a memory of the first device 102.

The first device 102 is configured to recognize the interaction area 124 defined by the plurality of markers, such as the markers 122a-d, on the panel 120. In an embodiment, the first device 102 is configured to send an interaction area identifier to the server 104. The server 104 may then provide some instructions to the first device 102 based on which the first device 102 recognizes the interaction area 124. Alternatively, the first device 102 is itself configured to recognize the interaction area 124 based on the interaction area identifier, for example, with the help of the central processing unit of the first device 102.

In an embodiment, the interaction area 124 can have one or multiple pointers, i.e., the user 110 can interact with one finger or multiple fingers. In this way, the user 110 can perform pinching gestures, zoom in/out gestures and so forth. In addition, the "pinch" gesture can be used to grab some virtual graphical user interface elements, something which can be hard to do on a touch screen.

Further, the first device 102 is configured to render the plurality of graphical user interface elements on the panel 120 in the Input/Output viewport 200 based on instructions from the server 104 or from the central processing unit of the first device 102. In an embodiment, rendering the plurality of graphical user interface elements in the Input/Output viewport 200 includes rendering the graphical user interface elements such that the plurality of graphical user interface elements visually align substantially on top (or front or behind) of the panel 120. In an embodiment, only the user 110 is able to view the plurality of graphical user interface elements rendered in the Input/Output viewport 200. This privacy can be enhanced further by randomizing position of virtual controls so that where the user 110 points on the panel 120 has no meaning for external viewers, thereby making the user 110 input really private. This can be useful when the user 110 uses an automated teller machine (ATM), described herein later in great detail in FIG. 5.

In an embodiment, the first device 102 may employ the information contained in the identification code in the panel 120, for facilitating rendering a user interface on the panel 120. For example, the first device 102 may employ the panel identifier of the panel 120 for rendering the user interface. Optionally, the first device 102 may additionally employ at least one of: device identifier of the first device 102, user identifier of the user 110 of the first device 102, location of the panel 120, and products and/or services associated with the panel 120. According to an embodiment, the first device 102 may obtain requisite information for creating the aforesaid user interface from at least one of the server 104, the external system 150, and the second device 160.

According to an embodiment, the first device 102 may be shared between multiple users. In such embodiment, the user interface rendered on the panel 120 may be customized for each of the multiple users. For example, two users A and B may share the first device 102 therebetween. In such example, the two users A and B may be employees of a same organization, wherein the two users A and B may use the first device in separate work shifts. Therefore, separate user interfaces may be rendered on the panel 120 for each of the users A and B.

In some embodiment, use of the first device 102 implies a stereoscopic view (or a three dimensional view), which allows the user 110 to access different layers of the plurality of graphical user interface elements rendered in three dimension (3D). In other words, the plurality of graphical user interface elements can be positioned in 3D with respect to the panel 120, providing the user 110 with the 3D experience.

In an embodiment, the first device 102 is configured to recognize the hand 112, the finger and the predefined detectable object in the Input/Output viewport 200. The hand 112, the finger and the predefined detectable object is directed towards at least one of the plurality of graphical user interface elements. According to an embodiment, at least one of the hand 112, the finger and the predefined detectable object is directed for performing at least a control operation of at least one of the first device 102 and a second device 160. In an embodiment, the control operation of the first device 102 includes, for example, increasing/decreasing volume of the first device 102. In an alternate embodiment, for controlling the operation of the second device, the first device 102 may send a device identifier of the second device to the server 104. The server 104 sends back to the first device 102 instructions stating which graphical user interface element to render. In an alternative embodiment, the predefined detectable object is directed for performing an operation with the external system 150.

According to an embodiment, first device 102 is further configured to render a new state of the plurality of graphical user interface elements in the Input/Output viewport 200. In an embodiment, the first device 102 is further configured to perform a perspective correction with one or more parameters defined by recognizing the plurality of markers, such as the markers 122*a-d*, and their geometrical relationship with each other. This allows the first device 102 to render user interaction and other elements so that they appear to be on the panel 120. Further, the first device 102 takes into account the displacement of the user 110 eyes (i.e. Inter Pupillary Distance), sensor to display transformation and display to eyes transformation, which transformation comprises both rotation and translation in space. In an embodiment, the first device 102 requires such information to overlay and align properly the plurality of graphical user interface elements on top (or front) of the panel 120. In an embodiment, the first device 102 is further configured to combine a device identifier with a panel identifier for rendering a personalized content on the first device 102.

In an embodiment, the panel 120 may not need to be touched for the user interaction. The detection of the plurality of graphical user interface elements and the markers 122*a-e* happens if the plurality of graphical user interface elements and the markers 122*a-e* are between the panel 120 and the camera 106 of the first device 102. The plurality of graphical user interface elements can be rendered in such a way that they appear to be floating in air when using the stereoscopic user device (i.e. the first device 102). For example, the user 110 (using a finger) points at the panel 120 from the billboard and places it over the plurality of graphical user interface elements, which can trigger an interaction of the first device 102 with his/her surroundings. In an embodiment, events like a click are time based, and the user 110 keeps the fingers or the plurality of graphical user interface elements in a same position. The events can also be detected as clicks if the user 110 moves the fingers or the plurality of graphical user interface elements away (for example, on Z-axis) and/or closer, simulating a click. In an embodiment, index and thumb fingers can also be used to pinch/grab the plurality of graphical user interface elements, for example to move those elements or to rotate a knob (for example, for regulating audio volume).

In an alternative embodiment, the panel 120 is a touch panel (for example, such as on an iPad) delimited by the plurality of markers, such as the markers 122*a-d*. In such instance, the plurality of markers, such as the markers 122*a-d* can be printed beside the screen or rendered on the screen of the touch panel. Further, in such instance, the panel 120 is configured to trigger detection upon touch, but the interaction is determined by the plurality of graphical user interface elements that are overlaid and displayed over the touch panel 120 (delimited by the markers 122*a-d*). In this way, privacy of the interaction and/or viewing experience of the user 110 are ensured and maintained.

In an embodiment, the plurality of markers, such as the markers 122*a-e* can be also shown on a display device. This display device can be for example, a computer monitor, a television or an ATM machine that shows the plurality of markers. In such instance, the camera 106 of the first device 102 then detects and overlays the plurality of graphical user interface elements on top of the display device so that only a user wearing a smart glass (i.e. the user 110) can see them. The user 110 can then interact with the interaction area 124 in a similar way as if the interaction area 124 was a touch-sensitive area. A touch, a tap, a pinch, a grab and other similar gestures can be detected via touch-screen (if available) or via computer detection of the hand/fingers or other graphical user interface elements detected over the panel 120. This can turn a flat surface into a three dimensional display and a three dimensional interaction area.

In an embodiment, the plurality of markers, such as the markers 122*a-e*, can also be external to the panel 120 (for example, around the panel 120) and the user 110 can still interact or see extra information on top of the panel 120. In an example, the marker 122*e* (such as a quick response code, one dimensional barcode, two dimensional barcode, alphanumeric code, radio frequency identification (RFID) code, and so forth) may be printed on a wall adjacent to the position of the panel 120 on the wall. In such instance, the user 110 can view information associated with the panel 120 thereon, using the marker 122*e*. In another example, the plurality of the markers 122*a-e* are rendered in an advertisement on a television screen, wherein the marker 122*e* or the associated code would define the interaction area to be on top of the TV screen, for example for getting extra information about the advertisement without disturbing the television viewing experience. In another example, the plurality of markers 122*a-e* may be rendered on aisles and/or shelves at a supermarket, wherein the plurality of markers 122*a-d* would define the interaction area to be on the aisles and/or proximal to the shelves. In such example, the user 110 of the first device 102 may use the marker 122*e* to view information about ongoing discounts and/or deals at the supermarket without obstructing the user 110's view of items arranged on the shelves.

In an embodiment, the plurality of markers, such as the markers 122*a-e* and the virtual controls (such as virtual buttons) for performing an operation are drawn on a control panel. The display is between the hand 112 and the eyes of the user 110. In such instances, the plurality of graphical user elements is occluded. Various finger detection algorithms detect an outline of (or parts of) the hand 112 interacting with the panel 120. This leads to hiding/cutting off parts of the overlay on those regions covered by the hand 112, thereby giving the user 110 a feeling that his hand 112 is over the panel 120 and the buttons/controls are under his fingers.

Figure 3:
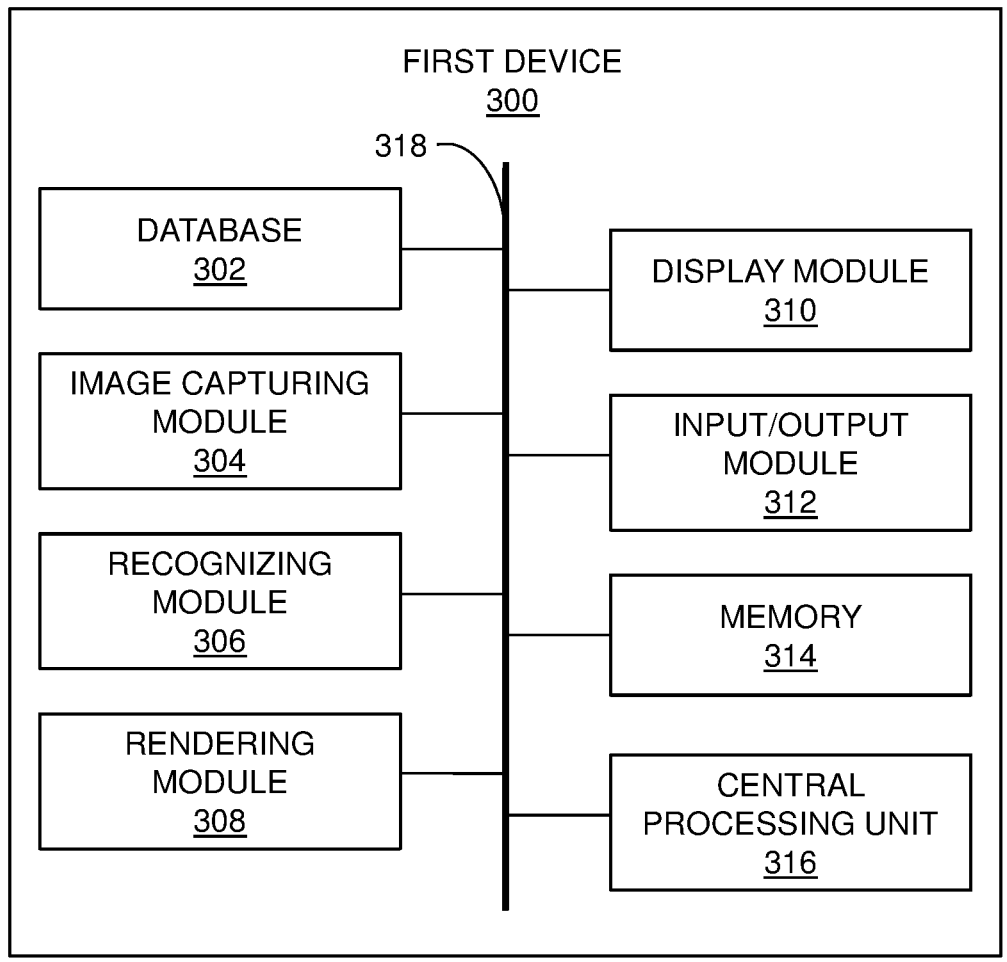
FIG. 3 illustrates a block diagram of a first device, in accordance with an embodiment of the present disclosure.

FIG. 3 illustrates a block diagram of a first device 300, such as the first device 102, in accordance with an embodiment of the present disclosure. Further, to explain system elements of FIG. 3, references will be made to the FIG. 1 and FIGS. 2A-2C.

As shown, the first device 300 primarily includes a database 302, an image capturing module 304, a recognizing module 306, a rendering module 308, a display module 310, an input/output module 312, a memory 314 and a central processing unit 316. The modules are connected to and can interact with each other via a bus 318. The bus 318 may be a communication system including wires (or even wireless) to enable different modules to interact and exchange data with each other.

The database 302 may store machine readable instructions which are executed by the modules 304-316. The database 302 also stores predefined control commands, predefined actions, modes of operations, access permission related information, and identity information (i.e. the device identifier) of the first device 102. The execution of the machine readable instructions enables the modules 302-316 to perform some steps needed for the user interaction. Each of the modules 302-316 can be a software, hardware, firmware, devices, or combination of these. Further, the modules 302-316 may be standalone product, a part of operating system, a library component for software developers to include gesture recognition capabilities and the like. The database 302 may further store the plurality of device identifiers, the plurality of panel identifiers, and rendering information prior to transmitting it to the database 140 of the server 104 (shown in FIG. 1A).

In an embodiment, the image capturing module 304 is a sensor, such as a camera capable of capturing images and/or recording videos of movement of the hand 112 (or the finger and the predefined detectable object). The image capturing module 304 may capture an image or a sequence of images including multiple images of the hand 112 (when points towards the panel 120) and store the image or the image sequence in the database 302.

In an embodiment, the image capturing module 304 includes one or more sensors configured to capture spatial data based on a movement of the hand 112 in the Input/Output viewport 200. Examples of the image capturing module 304 may include, but are not limited to, a sensor, such as a camera, a time of flight (ToF) camera, an infrared camera, scanning range detector devices (for example, LiDAR device) that provides a depth map of the image or environment. In an embodiment of the present disclosure, it is contemplated that any suitable number of cameras or other image capturing modules can be used, such as two cameras for the first device 300.

The recognizing module 306 is configured to recognize the interaction area 124 (shown in FIG. 1A-1D) defined by the plurality of markers, such as the markers 122a-d (shown in FIG. 1A-1D) on the panel 120 (shown in FIGS. 1-2C).

The rendering module 308 is configured to render the plurality of graphical user interface elements on the panel 120 in the Input/Output viewport 200 based on one or more instructions from the server 104 or from one or more instructions from the central processing unit 316 of the first device 300.

The Input/Output module 312 is configured to receive images of movement of the hand 112 of the user 110 (or the finger of the user 110 and the predefined detectable object). The recognizing module 306 is then configured to recognize the at least one of the hand 112 (or the finger of the user 110 and the predefined detectable object) in the Input/Output viewport 200.

Further, the rendering module 308 is configured to render a new state of the plurality of graphical user interface elements in the Input/Output viewport 200.

The display module 310 is configured to activate a display associated with the first device 300 when a start gesture is detected.

The memory 314 stores the algorithms and instructions for performing the disclosed steps or processes. The central processing unit (CPU) 316 may execute non-transitory computer or machine readable instructions for carrying out processes. The CPU 316 may be configured to perform a set of steps associated with the recognizing module 306 and the rendering module 308.

In an embodiment, the first device 300 further comprises at least one motion sensor (not shown) configured to detect movement of the first device 300, and wherein the first device 300 employs the detected movement to adjust a location of the interaction area 124. Specifically, such movement may include horizontal displacement, vertical displacement, tilting, rotation, and so forth, of the first device 300. More specifically, such movement of the first device may be attributed to the user 110's head movements.

In the aforesaid embodiment, measurement data (such as displacement value, tilting angle, and the like) obtained from the at least one motion sensor, may be processed by the central processing unit 316 of the first device 300. Thereafter, the measurement data may be communicated by the central processing unit 316 to the rendering module 308 to ensure fixation of the location of the interaction area 124 to be within the marker pattern (i.e. lie within the markers 122a-d). It is to be understood that such fixation of the location of the interaction area 124 may be desirable since movement of the first device 300 may lead to movement of the interaction area 124 outside the marker pattern (i.e. lie outside the markers 122a-d), which is undesirable. For example, the movement of the interaction area 124 may be associated with small movements of the user 110's head. Such movements of the user 110's head may lead to jittering of the rendered user interface. Therefore, the aforesaid embodiment beneficially reduces processing complexity/load that may be required to fixate the interaction area 124 to be within the marker pattern using computer vision means alone.

According to an embodiment, the at least one motion sensor configured to detect movement of the first device 300 may be selected from a group consisting of: accelerometer, gyroscope, magnetometer, infrared sensor, microwave sensor, inertial measurement unit, micro-electro-mechanical-system-based inertial measurement unit.

According to a further embodiment, the movement of the first device 300 can be detected by using other means. For example, the other means may include computer vision means, acoustic means and so on.

Figures 4A, 4B:
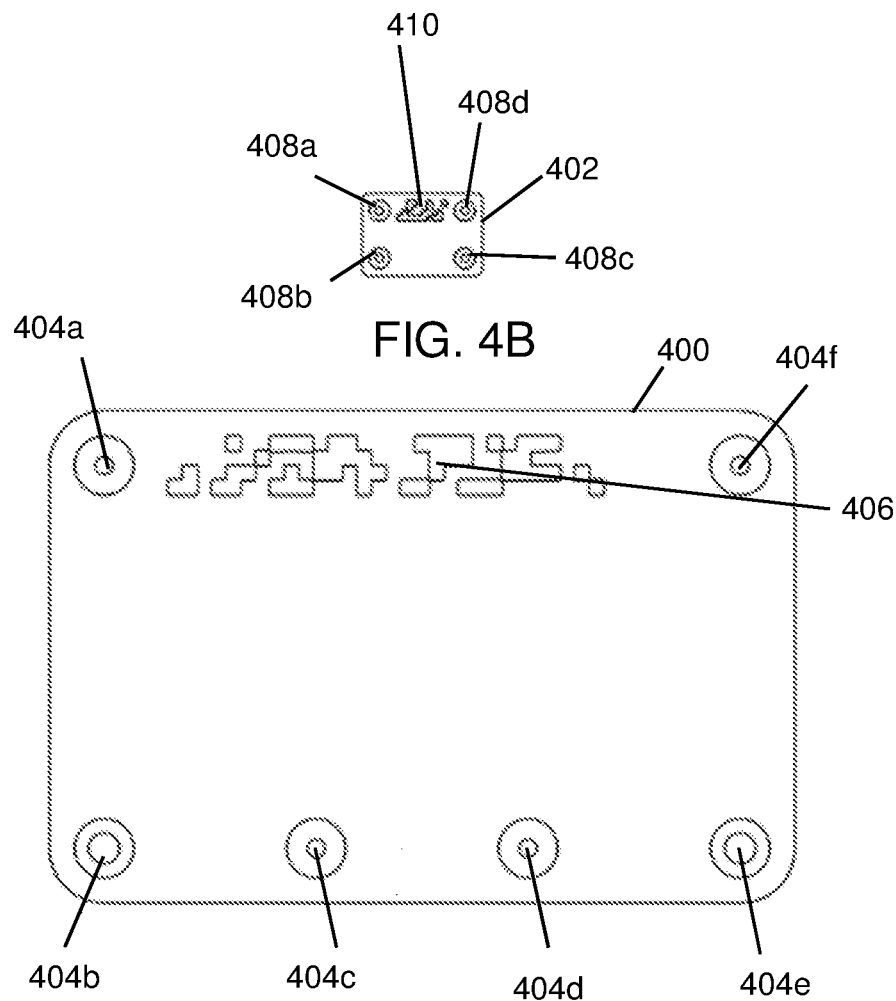
FIGS. 4A and 4B illustrate schematic illustrations of a first panel and a second panel having different sizes, respectively, in accordance with an embodiment of the present disclosure.

FIGS. 4A and 4B illustrate schematic illustrations of a first panel 400 and a second panel 402 having different sizes respectively, in accordance with an embodiment of the present disclosure. The first panel 400 and the second panel 402 are functionally similar to the panel 120. As shown, the first panel 400 is larger in size as compared to the second panel 402. Further, the first panel 400 includes a plurality of markers, such as markers 404a-f, and a panel identifier 406 in an encoded format (or the identification code 406). Similarly, the second panel 402 includes a plurality of markers, such as markers 408a-d, and a panel identifier 410 in an encoded format (or the identification code 410). In an example, the first panel 400 may be associated with a device (i.e. the first device and/or the second device) such as an iPad and whereas the second panel 402 may be associated with a device such as an iPhone.

Figure 5:
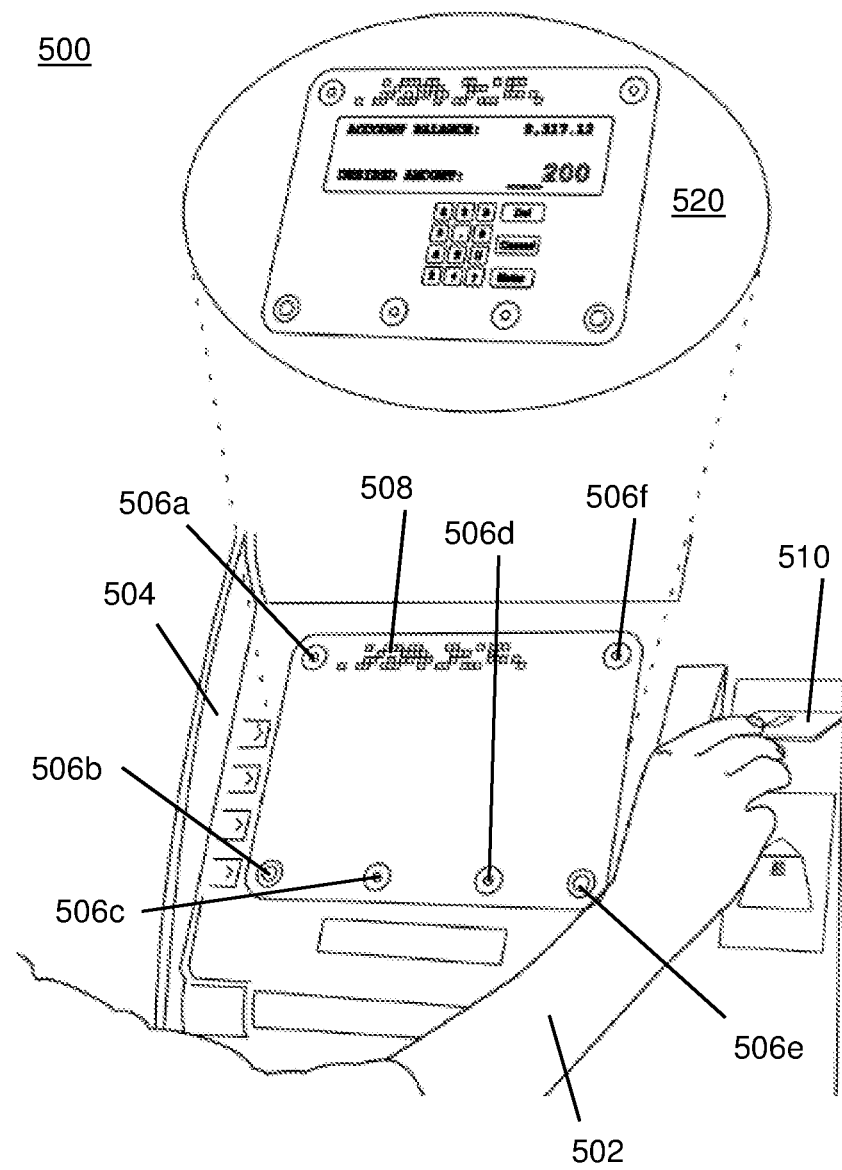
FIGS. 5 and 6 illustrate schematic illustration of exemplary use cases of a system for user interaction, in accordance with different embodiments of the present disclosure.

FIG. 5 illustrates a schematic illustration of an exemplary use case 500 of a system (such as the system 100) for the user interaction, explained in conjunction with the FIGS. 1-4. The use case 500 depicts the first device (such as the first device 102, not shown) having a see-through display. The use case 500 depicts a user 502 using an automated teller machine (ATM) 504. The user 502 wears a first device (not shown). As shown, a plurality of markers, such as markers 506a-f is positioned on the ATM 504. Further, shown is a panel identifier 508 in an encoded format, helping the first device (not shown) to recognize the ATM 504. Once the user 502 swipes his/her ATM card 510 on the ATM 504, the user 502 can enter a pin number and other details. In such instance, the user 502 is presented with a numeric virtual keypad 520 that is randomized and only the user 502 sees which numeric button is where. Therefore, an external viewer may not be able to know what buttons were pressed because the external viewer will only see that the user 502 is moving fingers over some physical panel, without seeing the user interface elements.

Figure 6:
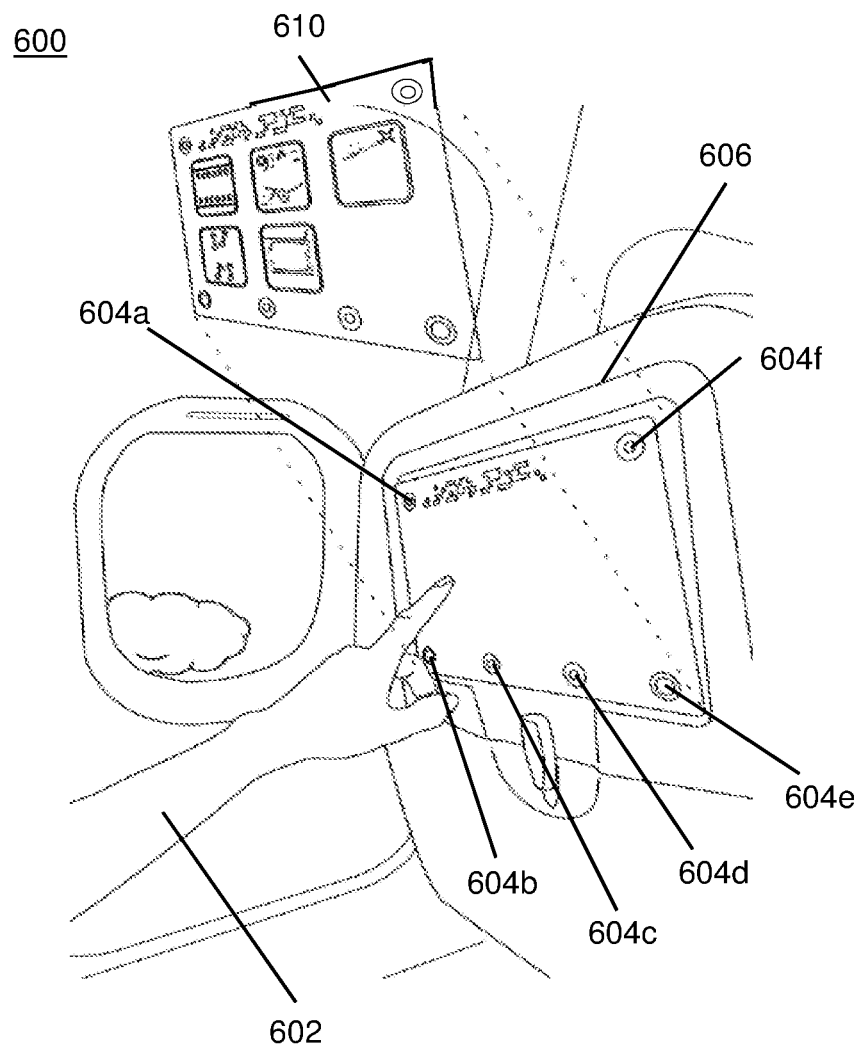

FIG. 6 illustrates a schematic illustration of another exemplary use case 600 of a system (such as the system 100) for user interaction, explained in conjunction with the FIGS. 1-4. The use case 600 may include the first device (such as the first device 102, not shown) having the see-through display. The use case 600 also depicts a passenger 602 travelling in a commercial airline. The passenger 602 uses a first device (not shown), particularly a plurality of markers, such as markers 604a-f may be provided at a back of a seat 606 in front of the passenger 602 to replace a current in-flight entertainment display. In such instance, the passenger 602 is presented with a virtual screen (or an interactive area) 610 where the passenger sees a menu, play games, change channels and so forth. The passenger 602 can also use the in-flight entertainment displays to display only the markers 604a-f and then use any surface to interact in 3D or use a table to also act as the interactive area.

According to an embodiment, there can be multiple use cases of the system for the user interaction. In an example, the system can be used in hospitals, due to private nature of the see-through display, and requirements for patient's privacy. Further, the authorized users wearing a first device (such as the first device 102) can interact and see the information associated with patient.

In another example, the panel virtual overlay can be adapted to a person viewing it and his/her security clearance. In another instance, in a lobby of a building residents can see information important to their living (for example, garbage collection timings and other notices that they may be asked to acknowledge by pressing a virtual button). In other instance, a postman can see where to deliver a package. Further, the postman can see names of people living in a block of flats. In yet another instance, a maintenance worker can see where a defective elevator is. Similarly, in a factory, a maintenance worker can interact with a machine using a panel (such as the panel 120) and get information therefrom. In some other instance, a security guard can see names on tags worn by workers, making an intruder unable to read those tags.

In further example, a back of a truck trailer (i.e. last part of a transportation unit) can be printed to include the markers. Front part can have a camera. The camera can be connected to the communication network. A truck or a car moving behind such unit can have a smart glass and see broadcast of the front camera of the truck, and hence improving safety on the road.

In another example, the markers can be printed inside a car to provide various virtual interactive areas to a person wearing the first device 102. The person can see through things (for example, by looking back the person can get a see-through/x-ray vision from a back camera overlaid on a back seat) enhancing visibility from within the car.

In an embodiment, a panel can also be placed on an object and an overlay would appear to a user to be located inside that object, for example to inspect an object without opening it. In yet another example, a user can get maintenance support remotely by using a first device (such as the first device 102) and the markers (such as the markers 122a-e) are used to show him how to fix things on a virtual screen. In some examples, using a billboard on a building or at concerts or other public events, the user 110 can input using the first device 102 and the hand 112 by looking at the screen/panel and see the virtual plurality of graphical user elements. For example, the user 110 can be presented with questions or product information and then the user 110 may choose to vote, pick or buy, like or share the product. In an embodiment, the user 110 can vote for a song or pick a band during the concert by just looking at a panel. In an embodiment, since every user has a different physical display (in his/her glasses or device), it is possible to show different plurality of graphical user elements to every user, for example depending on their location, age, interests, purchase history, and the like. Further, users can interact independently from each other or together (for example, in case of playing video games).

Figure 7:
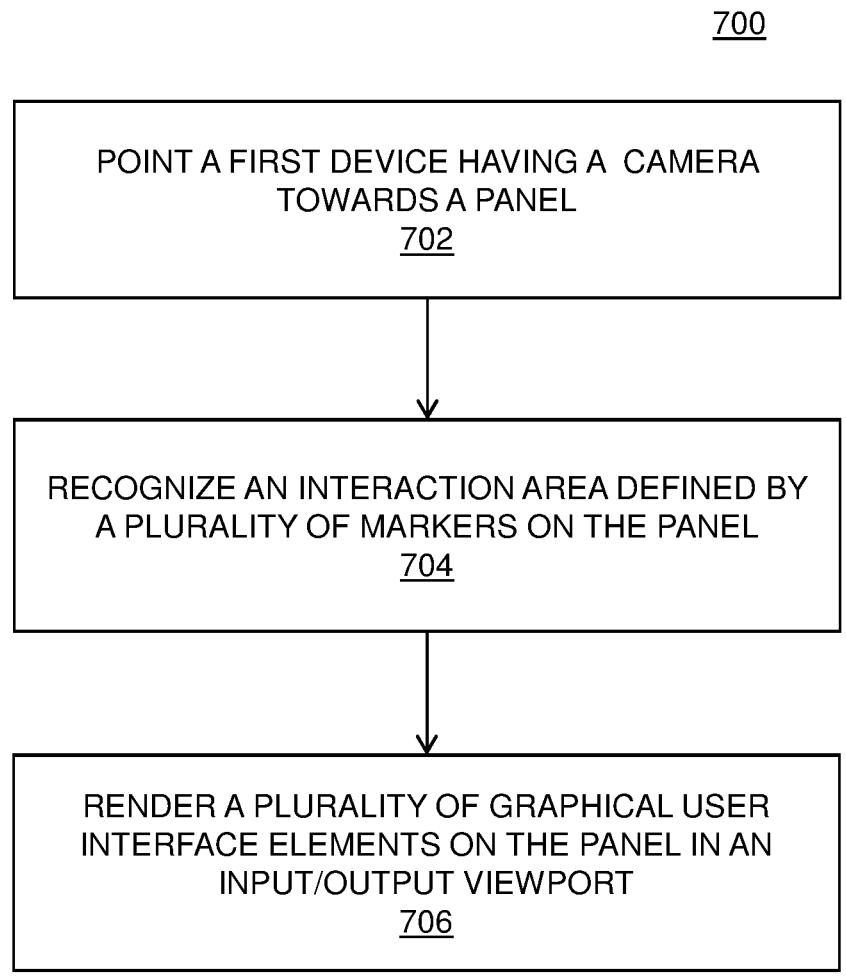
FIG. 7 is a flowchart illustrating a method for the user interaction, in accordance with an embodiment of the present disclosure.

FIG. 7 is a flowchart illustrating a method 700 for user interaction, in accordance with an embodiment of the present disclosure.

At step 702, a first device having a camera is pointed towards a panel. The panel defines a physical area having a plurality of markers rendered thereon. The plurality of markers comprises at least one of an object and a shape recognizable by suitable computer vision means.

At step 704, an interaction area defined by the plurality of markers on the panel is recognized.

At step 706, a plurality of graphical user interface elements on the panel is rendered in an Input/Output viewport. The Input/Output viewport comprises a spatial volume between the first device and the panel.

Further, the steps 702 to 706 are only illustrative and other alternatives can also be provided where one or more steps are added, one or more steps are removed, or one or more steps are provided in a different sequence without departing from the scope of the claims herein. For example, the method 700 further comprises recognizing at least one of a hand, a finger and a predefined detectable object in the Input/Output viewport. The at least one of the hand, the finger and the predefined detectable object is directed towards at least one of the plurality of graphical user interface elements. Further, the method 700 may include rendering a new state of the plurality of graphical user interface elements in the Input/Output viewport. Furthermore, the method 700 may include combining a device identifier with a panel identifier for rendering a personalized content on the first device. Optionally, the method 700 may further include detecting movement of the first device, and employing the detected movement to adjust a location of the interaction area.

The present disclosure provides a method and system for the user interaction. The method and system described in the present disclosure allows user interaction in an augmented reality environment, i.e. on a specific area well defined by a plurality of markers. The plurality of markers makes detection of a panel robust to occluding some of the markers. The method and system described in the present disclosure performs perspective correction for rendering the graphical user interface elements and detects pointers, such as a hand (or a finger or a predefined detectable object). Additionally, the present disclosure discusses the use of virtual control panels (i.e. virtual graphical user interface elements) in order to maintain privacy of the user's interaction experience.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A method for user interaction, the method comprising:
   pointing a sensor, mounted on head mounted smartglasses, towards a panel, wherein the smartglasses include an augmented reality display, and wherein the panel defines a physical area having a plurality of markers and a panel identifier;
   using the sensor to recognize the plurality of markers on the panel and an interaction area defined by the plurality of markers;
   using the sensor to recognize the panel identifier;
   using the recognized panel identifier to select a layout for a graphical user interface comprising a plurality of graphical user interface elements; and rendering the selected layout of the graphical user interface on the augmented reality display to appear to be floating in a spatial volume between the head mounted smartglasses and the interaction area defined by the plurality of markers; and to visually align with the panel;

wherein at least one of the plurality of markers comprises at least one of information and a hyperlink to the information, wherein the information comprises at least one of a location, product information, and user information;

wherein at least two of the plurality of markers are configured to be used as geometrical markers for defining a geometrical position and an orientation of the panel with respect to the head mounted smartglasses; and wherein the method further comprises:
measuring a color of the interaction area and using the color measurement to affect the rendering of the identified plurality of graphical user interface elements; and
randomizing positions of the identified plurality of graphical user interface elements when rendering the identified plurality of graphical user interface elements.

2. The method of claim 1, further comprising recognizing at least one of a hand, a finger and a predefined detectable object in the spatial volume between the head mounted smartglasses and the interaction area, wherein the at least one of the hand, the finger and the predefined detectable object is directed towards at least one of the plurality of graphical user interface elements as perceived by a user.

3. The method of claim 2, wherein the at least one of the hand, the finger and the predefined detectable object is directed for performing at least one control operation of at least one of the head mounted smartglasses and a second device.

4. The method of claim 1, further comprising rendering a new state of the plurality of graphical user interface elements in the spatial volume between the head mounted smartglasses and the interaction area.

5. The method of claim 4, wherein rendering the new state further comprises performing a perspective correction with one or more parameters defined by recognizing the plurality of markers and their geometrical relationship with each other.

6. The method of claim 1, further comprising combining a device identifier with the panel identifier for rendering a personalized content on the augmented reality display.

7. The method of claim 1, further comprising detecting movement of the head mounted smartglasses, and employing the detected movement to adjust a location of the interaction area.

8. The method of claim 1, wherein the plurality of markers and panel identifier are printed on the panel.

9. A system for user interaction, comprising:
a server comprising a database configured to store a plurality of device identifiers, a plurality of panel identifiers, and rendering information;
head mounted smartglasses having a sensor, wherein the smartglasses include an augmented reality display, and wherein the sensor is configured to be used for pointing towards a panel defining a physical area having a plurality of markers and a panel identifier rendered thereon, wherein the head mounted smartglasses are configured to:
recognize the plurality of markers on the panel and an interaction area defined by the plurality of markers;
recognize the panel identifier;
use the recognized panel identifier to select a layout for a graphical user interface comprising a plurality of graphical user interface elements; and
render the selected layout of the graphical user interface on the augmented reality display to appear to be floating in a spatial volume between the head mounted smartglasses and the interaction area defined by the plurality of markers; and to visually align with the panel;

wherein at least one of the plurality of markers comprises at least one of information and a hyperlink to the information, wherein the information comprises at least one of a location, product information, and user information, wherein at least two of the plurality of markers are configured to be used as geometrical markers for defining a geometrical position and an orientation of the panel with respect to the head mounted smartglasses; and wherein the system is configured to:
measure a color of the interaction area and using the color measurement to affect the rendering of the identified plurality of graphical user interface elements; and
randomize positions of the identified plurality of graphical user interface elements when rendering the identified plurality of graphical user interface elements.

10. The system of claim 9, wherein the head mounted smartglasses are further configured to recognize at least one of a hand, a finger and a predefined detectable object in the spatial volume between the head mounted smartglasses and the interaction area, wherein the at least one of the hand, the finger and the predefined detectable object is directed towards at least one of the plurality of graphical user interface elements.

11. The system of claim 9, wherein the head mounted smartglasses are further configured to render a new state of the plurality of graphical user interface elements in the spatial volume between the head mounted smartglasses and the interaction area.

12. system of claim 11, wherein the head mounted smartglasses are further configured to perform a perspective correction with one or more parameters defined by recognizing the plurality of markers and their geometrical relationship with each other when rendering the plurality of graphical user interface elements.

13. The system of claim 9, wherein the head mounted smartglasses are further configured to combine a device identifier with the panel identifier for rendering a personalized content on the augmented reality display.

14. The system of claim 9, wherein the head mounted smartglasses further comprise at least one motion sensor configured to detect movement of the head mounted smartglasses, and wherein the head mounted smartglasses employ the detected movement to adjust a location of the interaction area.

\* \* \* \* \*